Dec. 18, 1962   S. NYBERG   3,068,604
FISH LURE
Filed Feb. 2, 1959
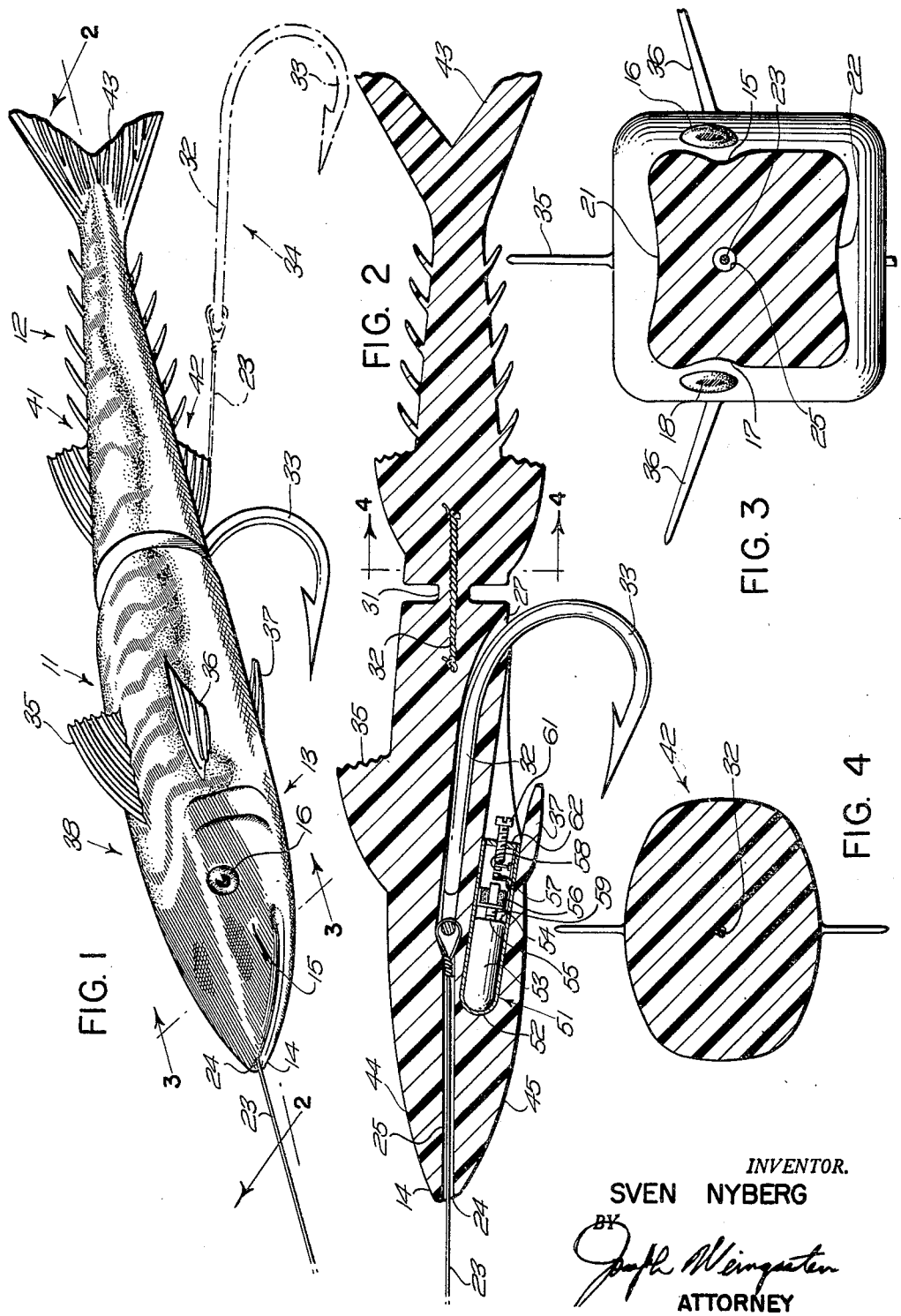
INVENTOR.
SVEN NYBERG
BY
*Joseph Weingarten*
ATTORNEY

United States Patent Office 3,068,604
Patented Dec. 18, 1962

3,068,604
FISH LURE
Sven Nyberg, Medford, Mass.
(Hiller Ave., Wellfleet, Mass.)
Filed Feb. 2, 1959, Ser. No. 790,594
1 Claim. (Cl. 43—42.05)

The present invention relates in general to fish lures and more particularly concerns a novel fish lure especially attractive to fish because of its close resemblance to a live fish in both appearance and action when pulled through the water. Furthermore, a fish taking the hook removes it from the lure, thereby preventing the fish from using the inertia of the lure to extract the hook and minimizing the wear on the lure. In addition, the lure is rugged and retains its coloring for long periods of extensive use.

Many lures have been designed to imitate the appearance of smaller fish. However, those lures exactly resembling a fish were unable to swim realistically. This seriously detracted from their value in attracting game fish.

Such lures swim upright when pulled through the water with a stabilizing fin on the bottom side of the head portion thereof. While this causes the lure to swim more realistically, its appearance less closely resembles that of a fish.

While prior art lures of this type were painted to resemble live fish, the paint was generally applied from the outside. After a period of use, the paint wore off in spots, reducing the degree of similarity between the lure and a live fish.

Generally, prior art lures of the plug type have the hook imbedded into the body of the lure. Therefore, when a fish strikes the hook and thrashes about in the water, the inertia of the plug is often an aid to the fish in getting free from the hook.

Accordingly, the present invention contemplates and has as a primary object the provision of a fish lure which attracts game fish and retains these characteristics over long periods of extended use.

It is a further object of the invention to provide a fish lure having the physical appearance of a live fish.

It is another object of the invention to provide a fish lure in accordance with the preceding object which swims like a real fish.

Still another object of the invention is to provide a fish lure colored to resemble a real fish in a manner which realistically emphasizes the colored pattern as viewed by game fish yet does not wear off, even after much use.

It is another object of the invention to provide a fish lure in accordance with the preceding objects which cannot be used by the fish as an aid in freeing itself from the hook.

Still a further object of the invention is the provision of a lure resembling a fish which separates from the hook when a fish is caught.

According to the invention, the lure comprises an elongate fish-like body having a forward section connected by a flexible junction to a tail section to permit movement of the tail resembling that of a swimming fish. The forward section has a head segment tapering rearward from the nose thereof and of generally rectangular cross-section. The sides of a length of the head section to the rear of the nose have surfaces just above the center line of the side curving inward slightly; that is, these surfaces are slightly concave. Preferably, the top and bottom of the length have surfaces symmetrically disposed about the center line thereof which also curve inward slightly to assume a concave shape. This structure results in the fish swimming upright while still resembling a live fish.

The forward section is formed with an arcuate channel therein extending from the nose to the center line of the forward section bottom just forward of the flexible junction. The lower portion of this arcuate channel accommodates the shank of a hook. When the hook is inserted into the arcuate channel, the nose is raised slightly to further enhance the stability of the lure in the water. A leader line may be fastened to the top of the shank and brought out through the opening of the arcuate channel in the nose.

A feature of the invention resides in the provision of an active sonic source within the lure effective in attracting fish thereto, even before the lure is seen by the fish.

Other features, objects and advantages of the invention will become apparent from the following specification when read in connection with the accompanying drawing in which:

FIG. 1 is a perspective view of a fish lure according to the invention;

FIG. 2 is a view through the central vertical section 2—2 of FIG. 1;

FIG. 3 is a sectional view showing the generally rectangular cross-section of the head along section 3—3 of FIG. 1; and FIG. 4 is a sectional view showing the generally oval cross-section of the tail section along section 4—4 of FIG. 2.

With reference now to the drawing, FIG. 1 thereof shows a perspective view of the novel lure which closely resembles a small fish and functions exceptionally well for catching striped bass.

The lure is seen to comprise an elongate fish-like body having a forward section 11 flexibly connected to a tail section 12. The forward section 11 has a head segment 13 of generally rectangular cross-section tapering rearward from the nose 14. A surface portion 15 extends along a length of the visible left side just forward of and approximately level with the eye 16 and curves inward slightly. That is, the surface 15 is slightly concave. In FIG. 3, which shows a view through section 3—3 of FIG. 1, the concave surface 15 on the life side is more clearly visible as is a similar surface 17 on the right side of the fish. Both the left eye 16 and the right eye 18 are also visible in FIG. 3.

In a similar manner, portions of the top and bottom surface of the head sections, 21 and 22, respectively, are curved inward slightly to form concave surfaces. The degree of curvature is greatly exaggerated in FIG. 3 to clearly show the principles of the invention. The rectangular cross-section of the head section 13 together with the side concave portions 15 and 17 materially aid in maintaining the fish in a generally upright position when being drawn through the water by providing vertical stability. The horizontal stability of the fish is enhanced by the top and bottom concave portions 21 and 22, respectively. As a practical matter, satisfactory stability is obtained if the dip in the center of the concave portions is approximately $\frac{1}{32}$ inch inward of a line joining the concave portion extremities.

A leader 23 is brought out through an opening 24 in the nose 14 from an arcuate channel 25 best seen in FIG. 2 which shows a central vertical section of the fish through section 2—2 of FIG. 1. The arcuate channel 25 extends from the nose 14 to the center of the bottom at an opening 27 just forward of the flexible section 31. The shank 32 of a hook 33 fits tightly within channel 25 and causes the nose 24 to be lifted slightly. Yet, when a fish strikes the hook 33, the hook slides out of the opening 25 to the position 34 while the lure slides up along leader 23.

Fins 35, 36 and 37 on the front section and the colored pattern 38 complete the front section so that it resembles the front section of a fish.

The tail section 12 is connected to the front section 11 by a flexible junction 31 having a cotton cord 31a therein to add strength without destroying flexibility. The tail section 12 is of generally oval cross-section as shown in FIG. 4 which is the sectional view through section 4—4 of FIG. 2. The tail section includes a top row of fins 41 and a bottom row of fins 42 and an appropriate colored pattern to resemble that of a fish. At the extremity of tail section 12 is a tail fin 43 which increases the vertical stability of the lure while at the same time aiding the lure to resemble a real fish.

It is seen from FIG. 2 that the top portion 44 of head section 13 has a degree of taper less than that of the bottom section 45. The bottom section 45 stabilizes the fish when riding on top of the water while the top and bottom portions 44 and 45 coact to provide horizontal stability when the lure is swimming beneath the surface of the water.

Preferably, the outer surface of the fish is a transparent layer, the color being applied to the interior thereof. Coloring under the clear surface results in the color being practically indestructible. Moreover, the colors are reflected better in the water to enhance the attraction of the lure to game fish.

In a preferred embodiment of the invention, the lure is formed with a cavity 51 for accommodating an active sonic source which emits underwater sounds effective in attracting fish toward the lure and inducing the fish to strike the lure. A suitable sonic source consists of a battery operated buzzer. The entire unit may be encased in a watertight capsule 52 which may be removed from cavity 51 to permit battery replacement. The outside shell, or negative electrode, of battery 53 is in conductive contact with a conducting strip 54. The positive electrode 55 of battery 53 is in conductive contact with a centrally located contact 59 connected to one end of the solenoid coil 56. The other end of solenoid coil 56 is connected to a movable contact 57 which is insulated from conducting strip 54.

When solenoid coil 56 is deenergized, it receives electrical energy from the negative electrode of battery 53 through fixed contact 58, conducting screw 61 and conducting end cap 62 which is in conductive contact with conducting strip 54. When energized, the solenoid draws the movable contact 57 away from fixed contact 58 to interrupt the flow of energy thereto and contact 57 returns to contact 58 due to the resiliency of the movable contact arm. This sequence of events occurs cyclically to produce an audible sound. Conducting screw 61 may be withdrawn when the lure is not being used, thereby functioning as a switch to conserve the battery. If end cap 62 is force fit into the capsule, screw 61 also functions to aid in removing end cap 62 when it is desired to replace the battery. The coil and contacts may be mounted on a common base which slides from capsule 52 easily when the battery is to be replaced.

The method of preparing a lure is as follows. A two-piece mold having the desired shape of the lure and mating along the central vertical section thereof is first preheated to a temperature of 250° F. The mold is then lined with a layer of clear Plastisol, a commercially available product produced by the Goodrich Rubber Company. Colors are prepared by dyeing clear plastisol with dyes corresponding to the desired fish coloring. The inner surface of the transparent layer of plastisol is painted while warm in accordance with the natural pattern of the fish which the lure is to resemble. The eyes 16 and 17 are then positioned in the molds together with the cotton fibre 32 and the molds are filled with clear plastisol, clamped together and baked for approximately one hour at a temperature of 350° F.

It is apparent that those skilled in the art may now make numerous modifications of and departures from the specific embodiment described herein without departing from the inventive concepts. Consequently, the invention is to be construed as limited only by the spirit and scope of the appended claim.

What is claimed is:

A fish lure comprising, an elongate fish-like body having a forward section connected by a flexible junction of reduced thickness to a tail section, said sections and said junction being integral with each other and formed of the same material, said flexible junction being reinforced by a length of cord embedded therein, said cord having one end embedded in said forward section and an opposite end embedded in said tail section, said forward section having a head segment comprising a nose, said head segment tapering toward said nose and being of generally rectangular cross-section, the sides of a length of said head section to the rear of said nose having concave surfaces just above the center line of said sides, the top and bottom sides of said length having concave surfaces symmetrically disposed about the center line thereof, said forward section being formed with an arcuate channel therein extending downwardly and rearwardly from said nose to the center-line of the bottom of said forward section just forward of said flexible junction, said arcuate channel arranged to accommodate the shank of a hook in a manner whereby insertion of said shank raises said nose slightly.

References Cited in the file of this patent

UNITED STATES PATENTS

| D. 177,176 | Hege | Mar. 20, 1956 |
| 1,582,713 | Welch | Apr. 27, 1926 |
| 2,127,639 | Breuer | Aug. 23, 1938 |
| 2,235,600 | Ammerman | Mar. 18, 1941 |
| 2,238,900 | Hadaway | Apr. 22, 1941 |
| 2,596,201 | Bocchino | May 13, 1952 |
| 2,690,026 | King | Sept. 28, 1954 |
| 2,740,222 | Velton | Apr. 3, 1956 |
| 2,784,399 | Smith | Mar. 5, 1957 |
| 2,854,779 | Jackson | Oct. 7, 1958 |
| 2,892,281 | Schilling et al. | June 30, 1959 |
| 2,908,988 | Kramer | Oct. 20, 1959 |

FOREIGN PATENTS

| 478,773 | Italy | Mar. 4, 1953 |